(12) United States Patent
Shipman

(10) Patent No.: US 9,828,741 B2
(45) Date of Patent: *Nov. 28, 2017

(54) APPARATUS FOR MOUNTING A TOOL TO A POWER VEHICLE

(71) Applicant: Duane G. Shipman, Edmond, OK (US)

(72) Inventor: Duane G. Shipman, Edmond, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,335

(22) Filed: Sep. 29, 2016

(65) Prior Publication Data

US 2017/0016205 A1   Jan. 19, 2017

Related U.S. Application Data

(63) Continuation of application No. 14/548,459, filed on Nov. 20, 2014, now Pat. No. 9,458,601.

(51) Int. Cl.
| | | |
|---|---|---|
| *E02F 3/36* | (2006.01) | |
| *E02F 3/96* | (2006.01) | |
| *E02F 3/38* | (2006.01) | |
| *B60R 11/06* | (2006.01) | |
| *A01G 23/06* | (2006.01) | |
| *B60R 11/00* | (2006.01) | |

(52) U.S. Cl.
CPC ............. *E02F 3/96* (2013.01); *B60R 11/06* (2013.01); *E02F 3/3677* (2013.01); *E02F 3/386* (2013.01); *E02F 3/963* (2013.01); *A01G 23/067* (2013.01); *B60R 2011/004* (2013.01); *B60R 2011/005* (2013.01)

(58) Field of Classification Search
CPC .......... B28D 1/045; E01C 23/088; E02F 5/14; E02F 5/06; E02F 9/20; E02F 3/386; E02F 3/627; E02F 3/384; E02F 9/085; E02F 3/963; E02F 3/96; E02F 3/3677; B60R 11/06; A01G 23/067

USPC ......... 37/468, 403–407, 443; 299/39.3, 36.1, 299/72, 75, 39.5, 73; 414/695, 723, 724

See application file for complete search history.

(56) References Cited

U.S. PATENT DOCUMENTS

| | | |
|---|---|---|
| 2,404,655 A | 7/1946 | Randall |
| 2,855,008 A | 10/1958 | Long |
| 3,625,267 A | 12/1971 | Welborn |
| 5,203,615 A | 4/1993 | Zanetis et al. |
| 5,382,084 A | 1/1995 | Diver et al. |
| 5,430,999 A | 7/1995 | Grant |

(Continued)

FOREIGN PATENT DOCUMENTS

WO    2008/048929    4/2008

OTHER PUBLICATIONS

"FFC Standard Flow Cold Planer," Everythingattachments.com, Retrieved from the Internet: URL: http://everythingattachments.com/product-p/ffc-stf-cold-planer.htm, 2009.

(Continued)

*Primary Examiner* — Robert Pezzuto
(74) *Attorney, Agent, or Firm* — Dunlap Codding, P.C.

(57) ABSTRACT

An apparatus for mounting a tool to a powered vehicle including a support frame, at least one mounting bracket, a threaded shaft, and a carriage assembly. At least one mounting bracket extends from the support frame and is configured to mount to the powered vehicle. The threaded shaft has a first end journaled to the support frame and a second end journaled to the support frame. The carriage assembly has a plurality of connectors and is movingly connected to the support frame and the threaded shaft.

11 Claims, 4 Drawing Sheets

(56) References Cited

U.S. PATENT DOCUMENTS

| | | |
|---|---|---|
| 5,655,581 A | 8/1997 | Craft |
| 5,823,238 A | 10/1998 | Bohnke |
| 6,116,699 A | 9/2000 | Kaczmarski et al. |
| 6,286,905 B1 | 9/2001 | Kimura et al. |
| 7,150,300 B1 | 12/2006 | Peterson |
| 2008/0066827 A1 | 3/2008 | Torgersen |
| 2015/0208569 A1 | 7/2015 | Pritchard |

OTHER PUBLICATIONS

"Cutter Technology: Adding Value to Excavators." *Drumcutters* (Version 1.0) [Brochure]. Retrieved from the Internet: www.drumcutters.com, 2014.

APPARATUS FOR MOUNTING A TOOL TO A POWER VEHICLE

CROSS REFERENCE TO RELATED APPLICATION

This application is a continuation of U.S. application Ser. No. 14/548,459, filed Nov. 20, 2014, the entire contents of which being hereby expressly incorporated herein by reference.

BACKGROUND

Power machines, such as a skid steer loaders, allow for attachment of an assortment of power tools, which are then powered by the hydraulic system of the power machine. The tools are typically mounted to the power machine in one of two ways. First, the tool is fixed to the power machine so that movement of the tool is affected by operation of the lift arms of the power machine and repeated re-positioning of the power machine. Second, the tool may be mounted to the power machine in a way that the tool may be moved along an arc by rotating the tool about a vertical axis to reposition the tool without requiring repositioning of the entire power machine.

While the ability to move the tool in this fashion is often met with success, at other times, space limitations may make it difficult to access a work site if the tool must be moved along an arc or if the entire power machine must be moved. To this end, a need exists for an apparatus for mounting a tool to a power vehicle that allows the tool to be moved linearly in a transverse direction. It is to such an apparatus that the inventive concepts disclosed herein are directed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Figure 1:
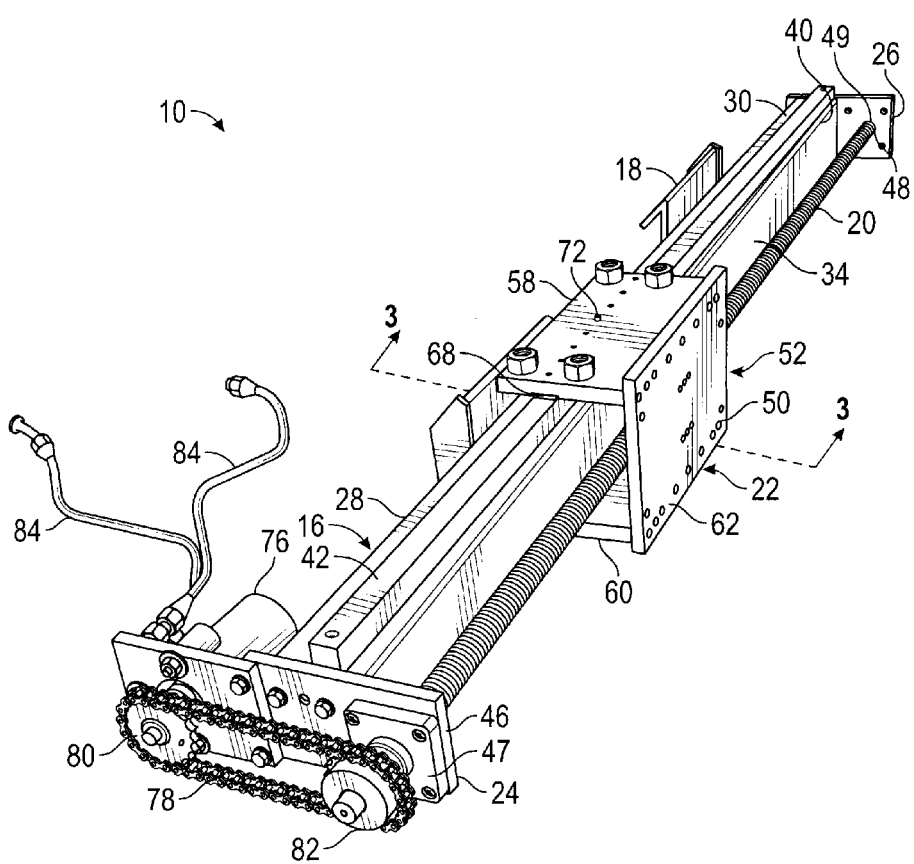
FIG. 1 is a front perspective view of an apparatus for mounting a tool to a power machine constructed in accordance with the inventive concepts disclosed herein.
Figure 2:
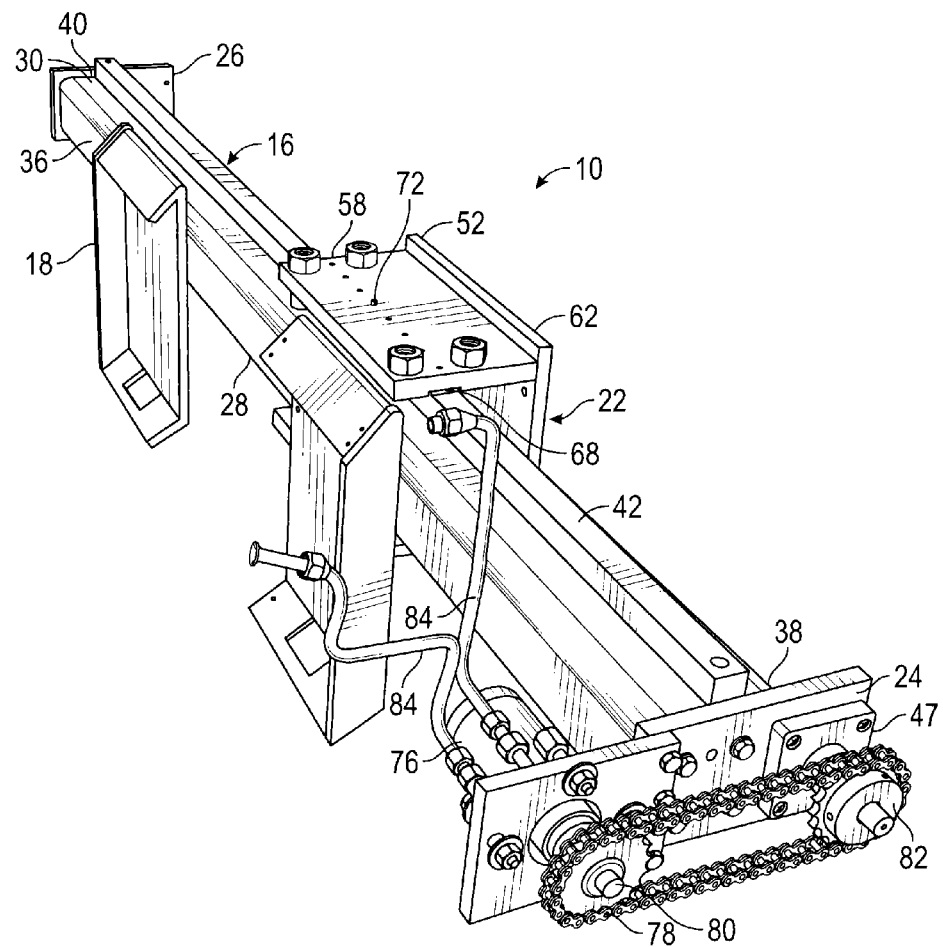
FIG. 2 is a rear perspective view of the apparatus of FIG. 1.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 4:
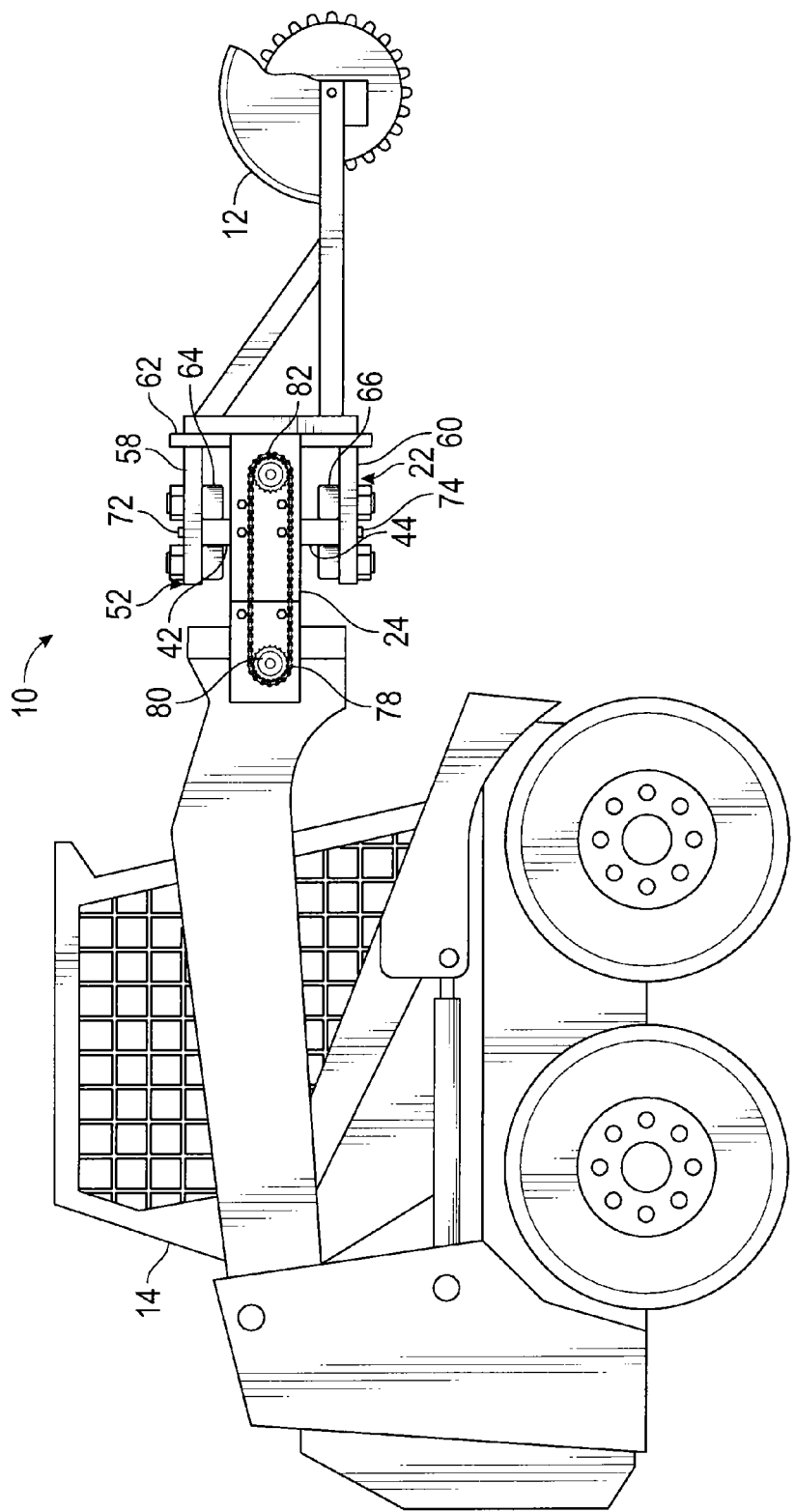
FIG. 4 is a side elevational view of the apparatus of FIG. 1 shown attached to a power machine with a tool attached to the apparatus.

Referring now to the drawings, an apparatus 10 constructed in accordance with the inventive concepts disclosed herein is illustrated. The apparatus 10 may be used for attaching a power tool to a power vehicle, such a tool 12 and a power vehicle 14 depicted in FIG. 4. The tool 12 is depicted in FIG. 4 as being a stump grinder, but it will be appreciated that the apparatus 10 may be employed with other types of tools, such as planers, jackhammers or the like. The power vehicle 14 is depicted in FIG. 4 as being a skid steer loader, but it will be appreciated that the apparatus 10 may be employed with other types of power vehicles, such as compact track loaders, tractors, excavators, truck booms, telehandlers, backhoes, and other equipment booms or hydraulic availability. Broadly, the apparatus 10 may include a support frame 16, a mounting bracket 18 configured to mount to the powered vehicle 14, a threaded shaft 20, and a carriage assembly 22 to which the tool 12 may be mounted.

The support frame 16 is generally an elongated structure configured to slidingly support the carriage assembly 22. In one embodiment, the support frame 16 may include a first end plate 24, a second end plate 26, and a beam 28. The beam 28 may have a top side 30, a bottom side 32, a front side 34, a rear side 36, a first end 38, and a second end 40. The first end 38 of the beam 28 is connected to the first end plate 24, and the second end 40 is connected to the second end plate 26. The first and second end plates 24 and 26 may be connected to the beam 28 in a suitable way, such as with fasteners or by welding.

The beam 28 may be provided in a variety of shapes and sizes. For example, the beam 28 may be rectangular, square, triangular, or other polyhedral shape. Also, the length of the beam 28 may be varied. For example, the beam 28 may have a length in a range from about two feet to about seven feet. The beam 28 may be formed of any suitable rigid material, including but not limited to, aluminum, brass, bronze, copper, chromium, iron, steel, carbon steel, titanium, or the like.

In one embodiment, the support frame 16 may have a first guide rail 42 extending along the top side 30 of the beam 28 and a second guide rail 44 extending along the bottom side 32 of the beam 28 in a parallel relationship to the first guide rail 42. To maximize travel of the carriage assembly 22, the first guide rail 42 and the second guide rail 44 may extend from the first end 38 of the beam 28 to the second end 40 of the beam 28. While two guide rails 42 and 44 have been illustrated, it will be appreciated that in some embodiments, the support frame 16 may include only one guide rail. The first guide rail 42 and the second guide rail 44 may be connected to the support beam 28 by way of screw, bolt, weld, or the like, integrally or, formed as a part of the beam 28. The first guide rail 42 and the second guide rail 44 may be of the same material as the beam 28 or they may be a different material.

The mounting bracket 18 extends from a rear side of the support frame 16. More particularly, the mounting bracket 18 may extend from the rear side 36 of the beam 28. The mounting bracket 18 may be connected to the beam 28 by way of screw, bolt, weld or the like. The mounting bracket 18 is configured to mount to a powered vehicle, such as the powered vehicle 14 shown in FIG. 4. The attachment configuration for such power vehicle is well known to those having ordinary skill in the art and, as such, will not be further described herein.

The threaded shaft 20 has a generally cylindrical form configured to be rotatable in a forward direction as well as a backward direction. The threaded shaft 20 has a first end 46 journaled to the first end plate 24 with a bearing 47 and a second end 48 journaled to the second end plate 26 with a bearing 49. The threaded shaft 20 may be in a spaced apart, parallel relationship to the beam 28. In one embodiment, the threaded shaft 20 may be threaded from the first end 46 to the second end 48. The threaded shaft 20 may be made of the same material as the beam 28, or the threaded shaft 20 may be made of a different material.

The carriage assembly 22 has a plurality of connectors 50 for mounting the tool 12 to the carriage assembly 22. The carriage assembly 22 is movingly connected to the beam 28 and the threaded shaft 20 in a way that rotation of the threaded shaft 20 in one direction causes the carriage assembly 22 to move linearly along the beam 28 and the threaded shaft 20 in a first direction and rotation of the threaded shaft 20 in an opposing direction causes the carriage assembly 22 to move linearly along the beam 28 and threaded shaft 20 in an opposing second direction. The carriage assembly 22 may be able to move along the entirety of the threaded shaft 20 and the beam 28.

Figure 3:
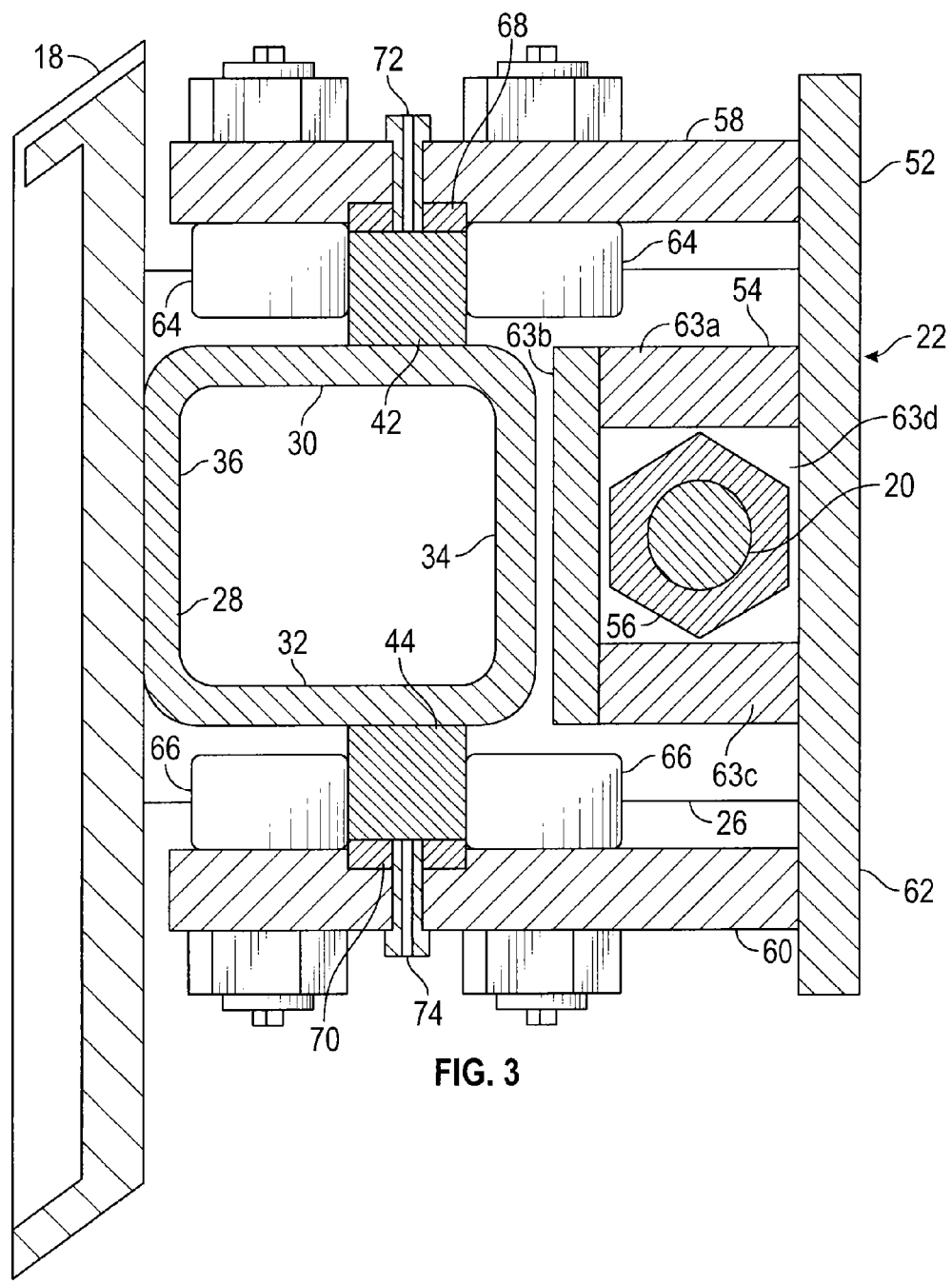
FIG. 3 is a cross-sectional view taken along line 3-3 of FIG. 1.

In one embodiment, the carriage assembly 22 comprises a carriage frame 52, a housing 54 extending from the carriage frame 52 and configured in a way that the threaded shaft 20 extends through the housing 54, and a nut 56 positioned in the housing 54 and threadingly engaged with the threaded shaft 20. The carriage frame 52 has a top side 58, a bottom side 60, and a front side 62. The front side 62 is provided with a plurality of connectors 50 for mounting the tool 12 to the carriage frame 52. In one embodiment, the connectors 50 may be a plurality of threaded apertures for receiving threaded fasteners. As best shown in FIG. 3, the housing 54 may include of a plurality of walls 63a-63d constructed to cooperate with the front side 62 of the carriage frame 52 to enclose the nut 56 (another wall component opposing wall 63d is not visible). The wall 63d and the opposing wall (not shown) are provided with a hole (not shown) for receiving the threaded shaft 20. The housing 54 may connect to the carriage frame 52 by way of nuts and bolts, screws, welds or the like. The nut 56 may be positioned in the housing 54 and may be threadingly engaged with the threaded shaft 20. The nut 56 may be threadingly engaged with the threaded shaft 20 in a way that rotation of the threaded shaft 20 in one direction causes the carriage assembly 22 to move linearly from the first end 38 of the beam 28 toward the second end 40 of the beam 28 and rotation of the threaded shaft 20 in an opposing direction causes the carriage assembly 22 to move linearly from the second end 40 of the beam 28 toward the first end 38 of the beam 28. In one embodiment, the nut 56 is not fixed to the housing 54, and the housing 54 and the nut 56 are sized so the nut 56 is moveable relative to the housing 54.

The carriage assembly 22 may further comprise a first plurality of roller members 64 extending downwardly from the top side 58 of the carriage frame 52 so as to be rollingly engaged with the first guide rail 42, and a second plurality of roller members 66 extending upwardly from the bottom side 60 of the carriage frame 52 so as to be rollingly engaged with the second guide rail 44. The first and second plurality of roller members 64 and 66 may be comprised of a metal or a polymeric material. The first and second plurality of roller members 64 and 66 may be connected to the carriage assembly 22 by way of bolt, screw, nut, weld or the like.

The carriage frame 52 may have a first wear plate 68 connected to the top side 58 of the carriage frame 52 so as to be in sliding contact with the first guide rail 42 and a second wear plate 70 connected to the bottom side 60 of the carriage frame 52 so as to be in sliding contact with the second guide rail 44 (FIG. 3). The first and second wear plates 68 and 70 serve to prevent deterioration of the top side 58 and the bottom side 60 of the carriage frame. The first and second wear plate 68 and 70 may be constructed of a metal or a polymeric material. The first and second wear plate 68 and 70 may be connected to the carriage frame 52 by way of screw, bolt, or the like.

A first grease port 72 may extend through the top side 58 of the carriage frame 52 to the first guide rail 42. A lubricant may be applied to the first guide rail 42 through the first grease port 72 so as to decrease friction between the first plurality of rollers 64, the first wear plate 68, and the first guide rail 42. A second grease port 74 may extend through the bottom side 60 of the carriage frame 52 to the second guide rail 44. A lubricant may also be applied to the second guide rail 44 through the second grease port 74 so as to decrease friction between the second plurality of rollers 66, the second wear plate 70, and the second guide rail.

A motor 76 with a chain 78 may be mechanically attached to the threaded shaft 20 to rotate the threaded shaft 20 in a forward or backward direction. The chain 78 may be mechanically attached to a first gear 80 and a second gear 82, such that when the motor 76 turns the first gear 80, the chain 78 turns the second gear 82 and the second gear 82 rotates the threaded shaft 20 in a forward or backward direction. The motor 76 may be positioned on the first end plate 24 or the second end plate 26. The motor 76 can be an electric ball screw-type motor, or other electric motor, or a hydraulic motor, or a motor powered by air pressure. The motor 76 may be powered by attachment to the power machine 14 via a plurality of hose couplers 84 in order to provide the motor 76 with hydraulic pressure, air pressure or electricity. Such attachment to a power machine 14 allows the user to control the rotation of the threaded shaft 20 from the power vehicle 14. However, it is appreciated that the threaded shaft 20 may be rotated by other means such as a hand crank so long as the threaded shaft 20 functions in accordance with the inventive concepts discloses herein.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and/or as defined in the appended claims.

What is claimed is:

1. An apparatus for mounting a tool to a powered vehicle, comprising:
    a support frame including a support beam having a top side, a bottom side, a front side, a rear side, a first end, and a second, a first guide rail extending from and along the top side of the support beam from the first end to the second end, and a second guide rail extending from and along the bottom side of the support beam from the first end to the second end;
    at least one mounting bracket extending from the rear side of the support frame, the at least one mounting bracket configured to mount to the powered vehicle;
    a threaded shaft having a first end journaled to the first end of the support frame and a second end journaled to the second end of the support frame; and
    a carriage assembly having a top side, a bottom side, a front side, and a plurality of connectors for mounting the tool to the front side of the carriage assembly, the carriage assembly movingly connected to the threaded shaft, the first guide rail, and the second guide rail in a way that rotation of the threaded shaft in one direction causes the carriage assembly to move linearly along the support beam and the threaded shaft in a first direction and rotation of the threaded shaft in an opposing direction causes the carriage assembly to move linearly along the support beam and the threaded shaft in an opposing second direction.

2. The apparatus of claim 1, wherein the carriage assembly further comprises:
    a carriage frame having a top side, a bottom side, and a front side;
    a housing extending from the carriage frame and configured in a way that the threaded shaft extends through the housing; and
    a nut positioned in the housing and threadingly engaged with the threaded shaft.

3. The apparatus of claim 2, wherein the nut is moveable relative to the housing.

4. The apparatus of claim 1, wherein the support beam is positioned between the mounting bracket and the threaded shaft.

5. The apparatus of claim 1, wherein the carriage frame has a first wear plate connected to the top side thereof so as to be in sliding contact with the first guide rail and a second wear plate connected to the bottom side thereof so as to be in sliding contact with the second guide rail.

6. The apparatus of claim 1, wherein the threaded shaft is threaded from the first end thereof to the second end thereof.

7. An apparatus for mounting a tool to a powered vehicle, comprising:
    a first end plate;
    a second end plate;
    a beam having a first end connected to the first end plate and a second end connected to the second end plate, the beam having a top side, a bottom side, a front side, and a rear side;
    a first guide rail extending along the top side of the beam from the first end to the second end thereof;
    a second guide rail extending along the bottom side of the beam from the first end to the second end thereof;
    at least one mounting bracket extending from the rear side of the beam, the at least one mounting bracket configured to mount to the powered vehicle;
    a threaded shaft having a first end journaled to the first end plate and a second end journaled to the second end plate such that the threaded shaft is in a spaced apart, parallel relationship to the beam; and
    a carriage assembly movingly connected to the beam and the threaded shaft for linear movement from the first end of the beam toward the second end of the beam and for linear movement in a reverse direction from the second end of the beam toward the first end of the beam, the carriage assembly comprising:
        a carriage frame having a top side movingly connected to the first guide rail, a bottom side movingly connected to the second guide rail, and a front side having a plurality of connectors for mounting the tool to the carriage frame;
        a housing extending from the carriage frame and configured in a way that the threaded shaft extends through the housing; and
        a nut positioned in the housing and threadingly engaged with the threaded shaft in a way that rotation of the threaded shaft in one direction causes the carriage assembly to move linearly from the first end of the beam toward the second end of the beam and rotation of the threaded shaft in an opposing direction causes the carriage assembly to move linearly from the second end of the beam toward the first end of the beam.

8. The apparatus of claim 7, wherein the nut is moveable relative to the housing.

9. The apparatus of claim 7, wherein the support beam is positioned between the mounting bracket and the threaded shaft.

10. The apparatus of claim 7, wherein the carriage frame has a first wear plate connected to the top side thereof so as to be in sliding contact with the first guide rail and a second wear plate connected to the bottom side thereof so as to be in sliding contact with the second guide rail.

11. The apparatus of claim 7, wherein the threaded shaft is threaded from the first end thereof to the second end thereof.

\* \* \* \* \*